United States Patent
Allard et al.

(10) Patent No.: US 7,506,820 B2
(45) Date of Patent: Mar. 24, 2009

(54) CONTACT-FREE INTEGRATED CIRCUIT HAVING AUTOMATIC FRAME IDENTIFICATION MEANS

(75) Inventors: Claire Allard, Rousset (FR); Michel Martin, Rognes (FR); Bruno Charrat, Aix en Provence (FR)

(73) Assignee: INSIDE Contactless, Aix en Provence Cedex (FR)

( * ) Notice: Subject to any disclaimer, the term of this patent is extended or adjusted under 35 U.S.C. 154(b) by 664 days.

(21) Appl. No.: 10/830,281

(22) Filed: Apr. 21, 2004

(65) Prior Publication Data
US 2004/0213169 A1 Oct. 28, 2004

Related U.S. Application Data

(63) Continuation of application No. PCT/FR02/03562, filed on Oct. 17, 2002.

(30) Foreign Application Priority Data
Oct. 23, 2001 (FR) .................................... 0113773

(51) Int. Cl.
*G06K 19/06* (2006.01)

(52) U.S. Cl. ....................................... 235/492; 235/451
(58) Field of Classification Search ................ 235/492, 235/451, 380, 737, 748; 361/737, 748
See application file for complete search history.

(56) References Cited

U.S. PATENT DOCUMENTS

| 6,588,660 B1 * | 7/2003 | Buescher et al. ............. 235/382 |
| 6,899,270 B2 * | 5/2005 | Obayashi et al. ............. 235/451 |
| 7,003,407 B1 * | 2/2006 | Kari et al. ...................... 702/57 |
| 2002/0080864 A1 * | 6/2002 | Kuttruff et al. ............... 375/211 |

FOREIGN PATENT DOCUMENTS

| FR | 2 751 148 A1 | 1/1998 |
| WO | WO 00/45328 A1 | 8/2000 |

* cited by examiner

*Primary Examiner*—Ahshik Kim
(74) *Attorney, Agent, or Firm*—Panitch Schwarze Belisario & Nadel LLP

(57) ABSTRACT

A contactless integrated circuit includes means for sending/receiving data by inductive coupling, means for providing a communication according to at least two determined protocols, and means for automatically switching into a communication mode conforming to one or other of the protocols depending on the profile of a start of frame received at the beginning of a communication.

65 Claims, 4 Drawing Sheets

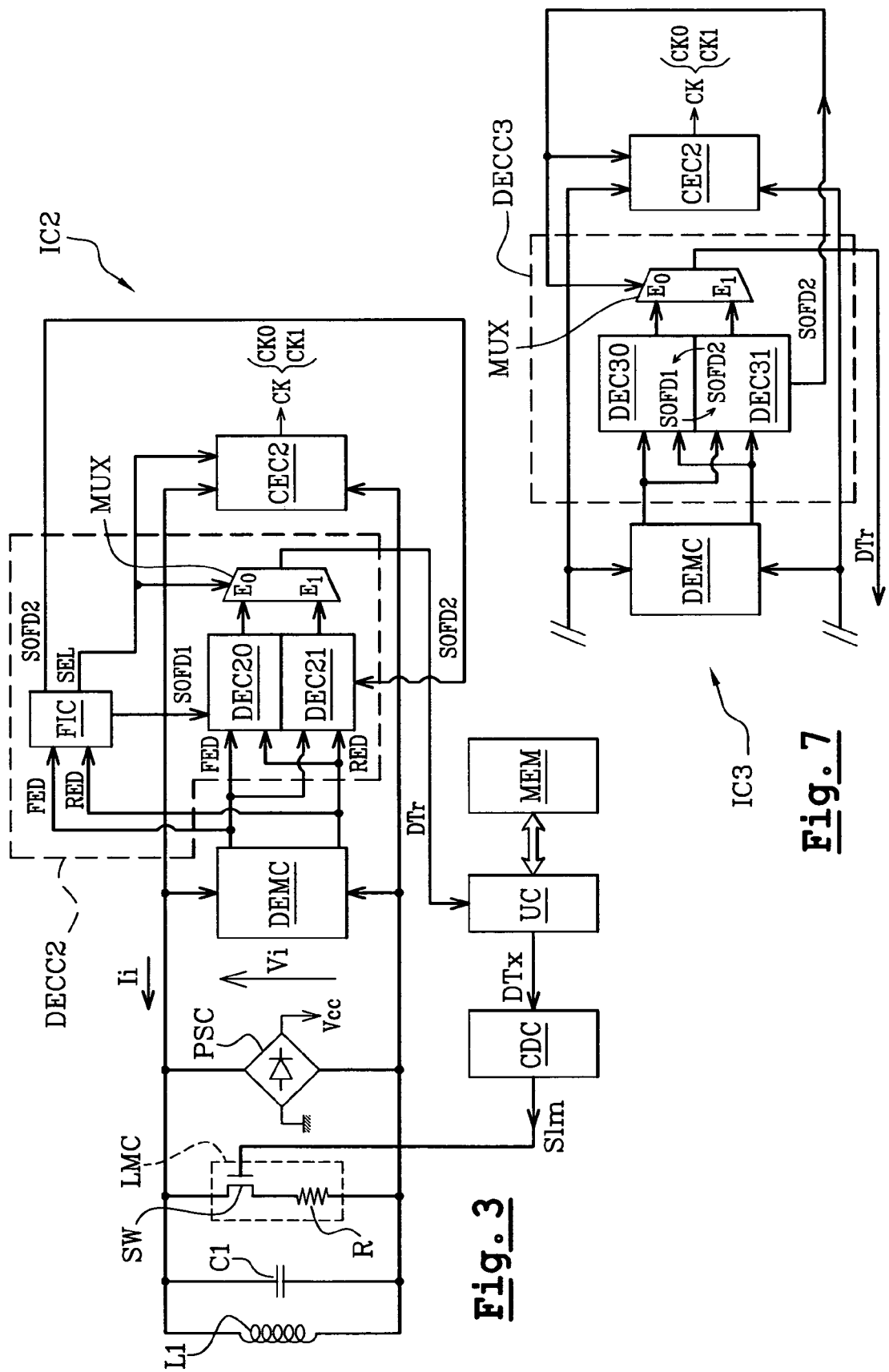

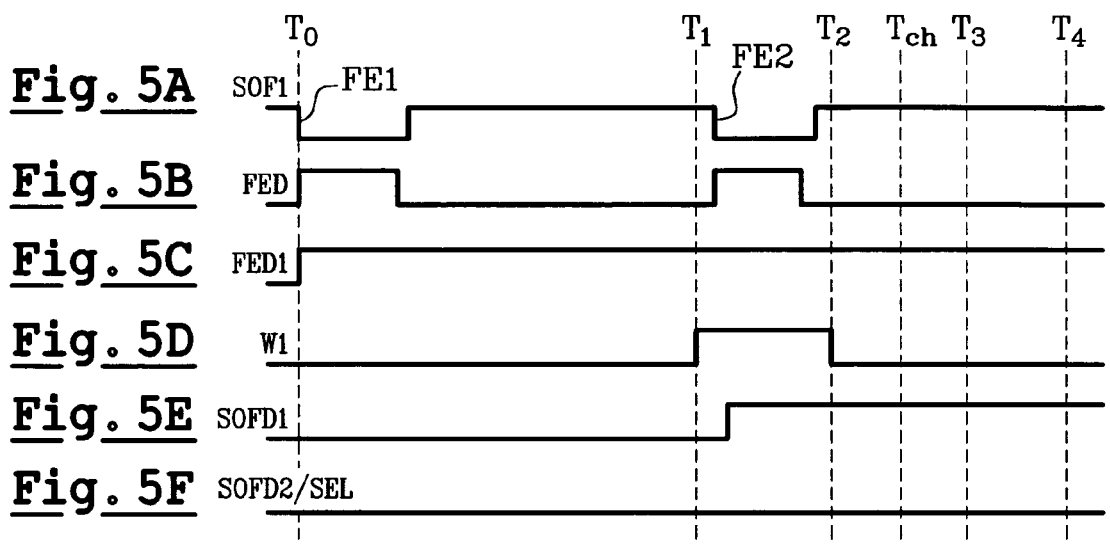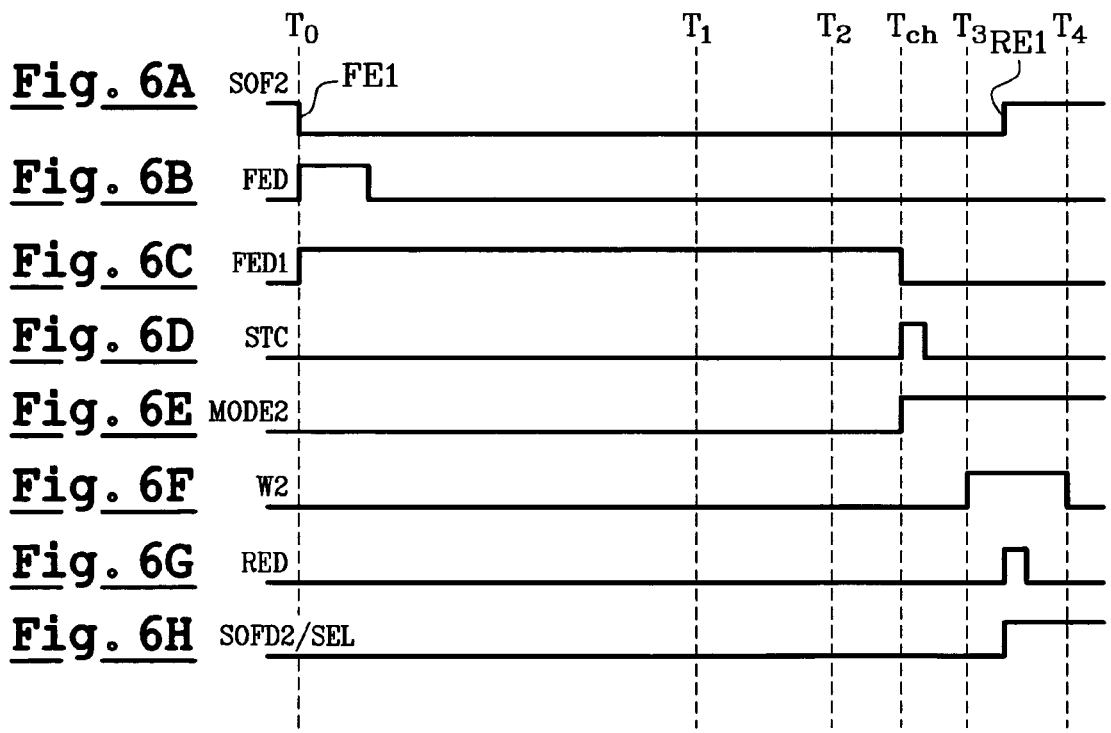

ial Appli-
CONTACT-FREE INTEGRATED CIRCUIT HAVING AUTOMATIC FRAME IDENTIFICATION MEANS

CROSS-REFERENCE TO RELATED APPLICATIONS

This application is a continuation of International Application No. PCT/FR02/03562, filed Oct. 17, 2002 and the disclosure of which is incorporated herein by reference.

BACKGROUND OF THE INVENTION

The present invention relates to contactless integrated circuits comprising means for sending/receiving data by inductive coupling. The present invention particularly, but not exclusively, relates to contactless integrated circuits provided for receiving data coded in accordance with the ISO/IEC 15693 standard or the ISO/IEC 14443-B standard.

In recent years, contactless integrated circuits have considerably developed and methods for transmitting data by inductive coupling, implemented by these integrated circuits, are currently the subject of various protocols, some of which are standardized.

FIG. 1 represents in block form a classical contactless integrated circuit IC1 architecture. The integrated circuit IC1 comprises a coil antenna L1 together with a capacitor C1 in parallel to form a resonant antenna circuit. These elements are sometimes outside the silicon wafer of the integrated circuit. The integrated circuit IC1 also includes a rectifier circuit PSC and a clock extraction circuit CEC1, that are both connected to the coil L1.

When the integrated circuit is immersed in an oscillating magnetic field emitted by a contactless integrated circuit reader (not represented), an induced alternative voltage Vi appears at the terminals of the coil L1. The circuit PSC delivers, using the induced voltage Vi, a voltage Vcc for supplying the integrated circuit, and the circuit CEC1 delivers the clock signal CK of the integrated circuit, the frequency of which is generally a sub-multiple of the carrier of the magnetic field.

The receiving of data by the integrated circuit IC1 is performed by a demodulator circuit DEMC connected to the coil L1, and by a decoding circuit DECC1. The circuit DEMC demodulates the voltage Vi by extracting it from its envelope and removing the carrier, and delivers a demodulated signal Sd containing data coded according to a determined protocol. The signal Sd is applied to the input of the decoding circuit DECC1 the output of which delivers binary data DTr. The data DTr are sent to the central unit of the integrated circuit, for example a central processing unit UC equipped with a memory MEM.

The sending of data by the integrated circuit is performed by a coding circuit CDC the output of which drives a load modulation circuit LMC connected to the terminals of the coil L1. The circuit LMC comprises for example a switch SW in series with a resistor R. Data to be transmitted DTx, delivered by the central processing unit or read directly in the memory MEM, are applied to the coding circuit CDC, the output of which delivers a load modulation signal Slm coded according to a determined protocol, applied to the control input of the switch SW (for example the gate of a transistor). Every time the switch SW is shut off this causes an antenna short-circuit leading to an attenuation of the ambient magnetic field, which is detected by the contactless integrated circuit reader and enables the latter to decode the data sent by the integrated circuit IC1.

As indicated above, contactless integrated circuits are the subject of various protocols, which define the characteristics of the signals intervening in a communication, as well as the coding of the data. The structural differences between two contactless integrated circuits provided to meet two different protocols mainly concern the decoding circuit DECC1 and the coding circuit CDC represented in FIG. 1.

As an example, the ISO/IEC 15693 standard provides for a coding by pulse position modulation of the data sent to a contactless integrated circuit, and a start of frame SOF1 the profile of which is represented in FIG. 2A. The ISO/IEC 14443-B standard provides for an NRZ coding of the data sent to a contactless integrated circuit, and a start of frame SOF2 the profile of is represented in FIG. 2B.

In practice, the provision of these various protocols is justified by technical reasons. Each protocol is provided to obtain determined performances in a determined category of applications. Thus, for example, the ISO/IEC 15693 protocol is suitable for applications requiring a relatively long communication distance and a relatively low data rate, while the ISO/IEC 14443-B protocol is suitable for applications requiring a short communication distance and a higher data rate.

A well-defined type of contactless integrated circuit corresponds to each protocol, which differs particularly from the other contactless integrated circuits by its coding and decoding circuits. The decoding circuit, in particular, includes means for recognizing a start of frame as provided by the protocol.

BRIEF SUMMARY OF THE INVENTION

The present invention is based on the observation according to which the multiplication of protocols complicates the manufacturing of the contactless integrated circuits and results in a diversification of the models of integrated circuits offered to industrial clients, who purchase contactless integrated circuits to produce electronic badges, contactless smart cards or other contactless portable electronic objects.

The present invention is also based on the observation according to which, in a same application, a given protocol can sometimes prove to be better than another protocol, or reciprocally, depending on the conditions of operation of the integrated circuit. Thus, for example, it may be desirable for an electronic badge equipped with a contactless integrated circuit to have in certain cases a high data rate to the detriment of the communication distance, and in other cases a long communication distance to the detriment of the data rate.

Thus, one aspect of the present invention is to provide a "multiprotocol" and "configurable" type contactless integrated circuit, i.e. capable of providing a communication according to at least two different protocols according to the configuration applied thereto.

However, providing a "configurable" integrated circuit means that the integrated circuit must be configured before being commissioned, so as to determine its operating mode. Such a configuration step involves an extra handling operation and is therefore not desirable. Furthermore, as indicated above, a first protocol may sometimes prove to be better than a second protocol or reciprocally according to the conditions of operation of the integrated circuit within a same application.

Briefly stated, the present invention comprises a contactless integrated circuit which reduces the number of models offered to industrial clients while being easy to use. The contactless integrated circuit includes means for sending/receiving data by inductive coupling, means for providing a communication according to at least two determined protocols, and means for automatically switching into a communication mode conforming to one or other of the protocols depending on the profile of a start of frame received at the beginning of a communication.

According to one embodiment, the integrated circuit comprises a first decoding unit for decoding data coded according to a first protocol, at least a second decoding unit for decoding data coded according to at least a second protocol, and means for selecting the first or the second decoding unit depending on the profile of a start of frame received at the beginning of a communication.

According to one embodiment, the integrated circuit comprises means for detecting a start of frame of a first type corresponding to the first protocol, arranged for delivering a first start of frame detection signal when a start of frame of the first type is detected, and means for detecting a start of frame of a second type corresponding to the second protocol, arranged for delivering a second start of frame detection signal when a start of frame of the second type is detected.

According to one embodiment, the means for detecting a start of frame of the first type are arranged for detecting a first variation edge of the signal received by inductive coupling, then detecting in a first time window a second variation edge of the signal received by inductive coupling, and the means for detecting a start of frame of the second type are arranged for detecting a first variation edge of the signal received by inductive coupling, then detecting in a second time window a second variation edge of the signal received by inductive coupling.

According to one embodiment, the means for detecting a start of frame of the first type are arranged for detecting two variation edges of a same type, and the means for detecting a start of frame of the second type are arranged for detecting a variation edge of a first type and a variation edge of a second type that is the opposite of the first type.

According to one embodiment, the integrated circuit comprises means for inhibiting the means for detecting a start of frame of the first type, when a determined time situated between the first and the second time windows has elapsed after appearance of a first variation edge of the signal received by inductive coupling.

According to one embodiment, the integrated circuit comprises means for inhibiting the means for detecting a start of frame of the second type when a start of frame of the first type is detected.

According to one embodiment, the integrated circuit comprises a start of frame identification circuit common to the first and second decoding units, wherein the means for detecting a start of frame of the first type and the means for detecting a start of frame of the second type are arranged.

According to one embodiment, the first decoding unit comprises the means for detecting a start of frame of the first type, and the second decoding unit comprises the means for detecting a start of frame of the second type.

According to one embodiment, the selection means comprise means for deactivating the second decoding unit or for deactivating the first decoding unit.

According to one embodiment, the selection means comprise a means for multiplexing the outputs of the decoding units.

According to one embodiment, the multiplexing means is arranged for selecting by default the output of the first decoding unit and for selecting the output of the second decoding unit when a start of frame corresponding to the protocol of the second decoding unit is received.

According to one embodiment, the multiplexing means comprises a selection input driven by a start of frame detection signal.

According to one embodiment, the integrated circuit comprises a clock extractor circuit arranged for delivering a first clock signal of determined frequency when the integrated circuit is in a communication mode conforming to a first protocol, and delivering a second clock signal of a different frequency from that of the first clock signal, when the integrated circuit is in a communication mode conforming to a second protocol.

According to one embodiment, the integrated circuit comprises means for communicating according to at least the ISO/IEC 15693 protocol and the ISO/IEC 14443-B protocol, and means for automatically switching into a communication mode conforming to one or other of these protocols depending on the profile of a start of frame received at the beginning of a communication.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 3 is the block diagram of a contactless integrated circuit according to the present invention;

FIG. 5A represents a start of frame profile conforming to the one represented in FIG. 2A;

FIG. 5B to 5F represent various logic signals appearing in the circuit represented in FIG. 4 upon receiving the start of frame represented in FIG. 5A;

FIG. 6A represents a start of frame profile conforming to the one represented in FIG. 2B;

FIG. 6B to 6H represent various logic signals appearing in the circuit represented in FIG. 4 upon receiving the start of frame represented in FIG. 6A; and FIG. 7 shows an alternative embodiment of certain elements of the contactless integrated circuit in FIG. 3.

DETAILED DESCRIPTION OF THE INVENTION

Figure 1:
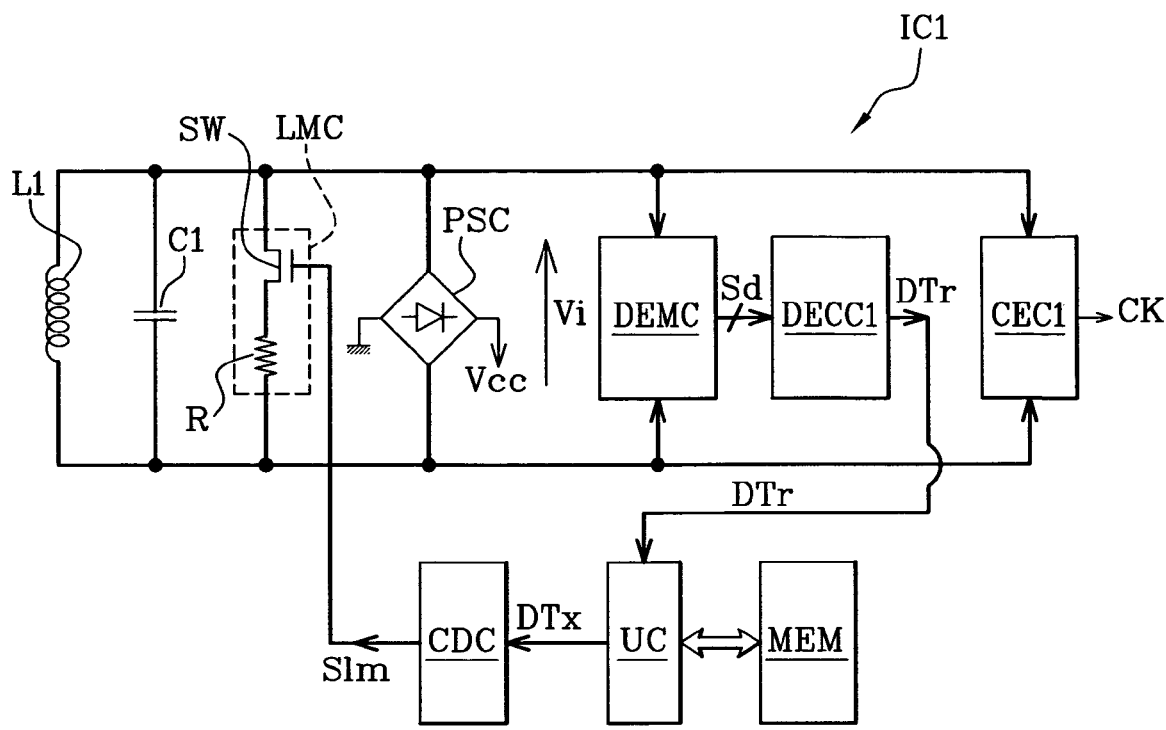
FIG. 1 described above is the block diagram of a classical contactless integrated circuit.

FIG. 3 represents in block form a contactless integrated circuit IC2 according to the present invention. The integrated circuit IC2 has a general architecture that is classical per se and comprises an antenna circuit comprising a coil L1 and a capacitor C1, a rectifier circuit PSC connected to the terminals of the coil and delivering a supply voltage Vcc, and a clock extraction circuit CEC2 connected to the terminals of the coil and delivering a clock signal CK. A demodulator circuit DEMC connected to the terminals of the coil L1 delivers a demodulated signal formed by two signals FED, RED. These signals are applied to a decoding circuit DECC2, the output of which delivers data DTr received by inductive coupling. The data DTr are applied to a central unit of the integrated circuit, comprising for example a hard-wired logic or microprocessor central processing unit UC, and a memory MEM. Finally, a coding circuit CDC linked to the central processing unit UC receives data DTx to be sent, and delivers a load modulation signal Slm to a load modulation circuit LMC that is connected to the terminals of the coil L1.

The circuit DEMC is of a classical type and demodulates an induced voltage Vi appearing at the terminals of the coil L1 in the presence of an oscillating magnetic field emitted by a contactless integrated circuit reader. This voltage Vi has a primary oscillation corresponding to the carrier of the magnetic field (generally 13.56 MHz) and also has, when data are sent by the reader, an amplitude modulation (or envelope modulation) that is the image of the amplitude modulation applied by the reader to the ambient magnetic field, and which is detected by the circuit DEMC. It is also possible to demodulate an induced current Ii passing through the coil L1, instead of demodulating the voltage Vi.

The signal FED delivered by the circuit DEMC is a falling edge detection signal that here has a pulse on 1 when an amplitude modulation falling edge appears in the ambient magnetic field. The signal RED is a rising edge detection signal that here has a pulse on 1 when an amplitude modulation rising edge appears in the ambient magnetic field. The pulses delivered by the circuit DEMC are for example of a duration of 1 etu, one etu being one "elementary time unit" equal to 9.44 µs.

The integrated circuit IC2 differs from a classical integrated circuit in that the decoding circuit DECC2 is a "biprotocol" decoding circuit comprising two distinct decoding units DEC20 and DEC21, each receiving the signals FED and RED at input. The unit DEC20 is provided for decoding data coded in accordance with a first protocol, and the unit DEC21 is provided for decoding data coded in accordance with a second protocol. The outputs of the decoding units DEC20, DEC21 are respectively applied to the inputs E0 and E1 of a multiplexer MUX, the output of which forms the output of the decoding circuit DECC2.

According to the present invention, the decoding circuit DECC2 is arranged for automatically identifying the protocol used at the start of a communication, and for selecting the decoding unit DEC20 or DEC21 suitable to the protocol identified. Again according to the present invention, the protocol is identified by an analysis of the profile of a start of frame (SOF) received at the beginning of a communication.

In the embodiment represented in FIG. 3, the protocol is automatically identified by a start of frame identification circuit FIC according to the present invention, present in the decoding circuit DECC2. The circuit FIC receives the signals FED and RED at input and delivers signals SOFD1, SOFD2 and SEL. The signal SOFD1 is a start of frame detection signal according to the first protocol and is applied to the decoding unit DEC20. The signal SOFD2 is a start of frame detection signal according to the second protocol and is applied to the decoding unit DEC21. The signal SEL is applied to the selection input of the multiplexer MUX, and its value determines the input E0 or E1 that is selected at the output of the multiplexer.

Below, an example of an embodiment of the circuit FIC will be described in relation with the standardized ISO/IEC 15693 and ISO/IEC 14443-B protocols, to which reference is made here as an example of implementation of the present invention without limitation.

Within the scope of such an implementation of the present invention, the unit DEC20 decodes data coded in accordance with the ISO/IEC 15693 protocol and the unit DEC21 decodes data coded in accordance with the ISO/IEC 14443-B protocol. For simplicity, the architecture of the decoding units DEC20, DEC21, which is classical per se and within the understanding of those skilled in the art, will not be described. For memory, the coding of data according to ISO/IEC 15693 is a bit pair coding by pulse position, a pulse being formed by field holes of a duration of 1 etu capable of occupying four positions in time segments of 8 etu. This protocol offers a relatively low data rate in the order of 26 k bit/s but a relatively long communication distance in the order of 40 to 50 cm. Furthermore, the coding of data coded in accordance with the ISO/IEC 14443-B protocol is a bit-by-bit coding of NRZ type, offering a higher data rate in the order of 106 kbit/s and a shorter communication distance in the order of 20 to 25 cm.

Figure 2A:
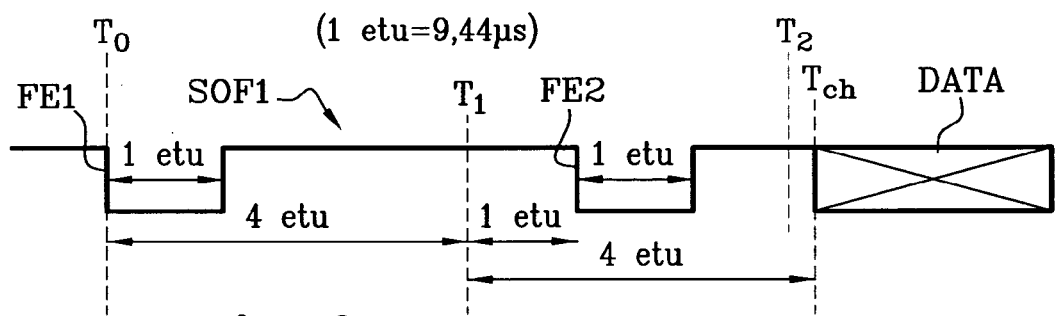
FIG. 2A, 2B represent two classical start of frame profiles.

The start of frame profile SOF1 according to the ISO/IEC 15693 protocol, represented in FIG. 2A, has two field holes of a width of 1 etu each comprised in a half time segment of 4 etu. The start of frame SOF1 is therefore of a duration of 8 etu and is followed by pair coded data DATA. It has two falling edges FE1, FE2 corresponding to the two field holes, indicated by pulses of the signal FED delivered by the demodulator DEMC. The first falling edge FE1 is the starting point of the start of frame SOF1 and falls within the first half time segment. The second falling edge FE2 falls within the second half time segment and appears 1 etu after the beginning of the second half segment.

Thus, the detection of the start of frame SOF1 by the circuit FIC here comprises the detection of the first falling edge FE1, then the detection of the second falling edge FE2 in a time window delimited by times T1 and T2 calculated as from the first falling edge FE1. The time T1 is for example equal to 4 etu, i.e. the beginning of the second half time segment, and the time T2 equal to 7 etu, i.e. 3 etu after the beginning of the second half time segment.

Figure 2B:
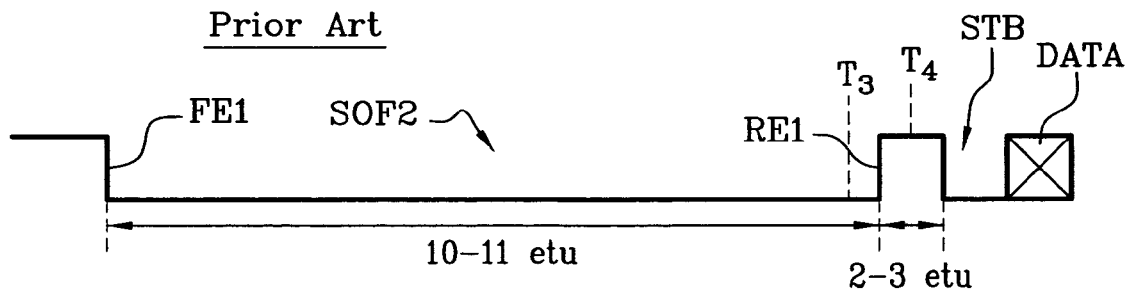

The start of frame profile SOF2 provided by the ISO/IEC 14443-B protocol, represented in FIG. 2B, has a single field hole of a duration of 10 to 11 etu. This field hole is followed by a plateau without amplitude modulation of a duration of 2 to 3 etu. The start of frame SOF2 is therefore of a duration of 12 to 14 etu and is followed by a start bit STB then by NRZ coded data DATA. It has a falling edge FE1 appearing at the beginning of the field hole and a rising edge RE1 corresponding to the end of the field hole, the falling edge FE1 being indicated by a pulse of the signal FED and the rising edge RE1 indicated by a pulse of the signal RED.

Thus, the detection of the start of frame SOF2 by the circuit FIC here comprises the detection of the falling edge FE1 and the detection of the rising edge RE1 in a time window delimited by times T3 and T4 calculated as from the falling edge FE1, T3 and T4 being higher than T2. The time T3 is for example equal to 10 etu and the time T4 equal to 13 etu.

It is clear that in practice, the choice of T1, T2, T3 and T4 is not fixed and depends on the degree of tolerance that is to be granted to the start of frame identification circuit FIC.

According to one aspect of the present invention, a transition time Tch calculated as from the falling edge FE1 is also defined, which corresponds to the total duration of the start of frame SOF1. The time Tch is therefore between T2 and T3 and is for example equal to 8 etu. When the time Tch is reached and a start of frame SOF1 has not been detected, the circuit FIC only seeks to detect a start of frame SOF2, as will be seen below in the light of an example of an embodiment of the circuit FIC.

Figure 4:
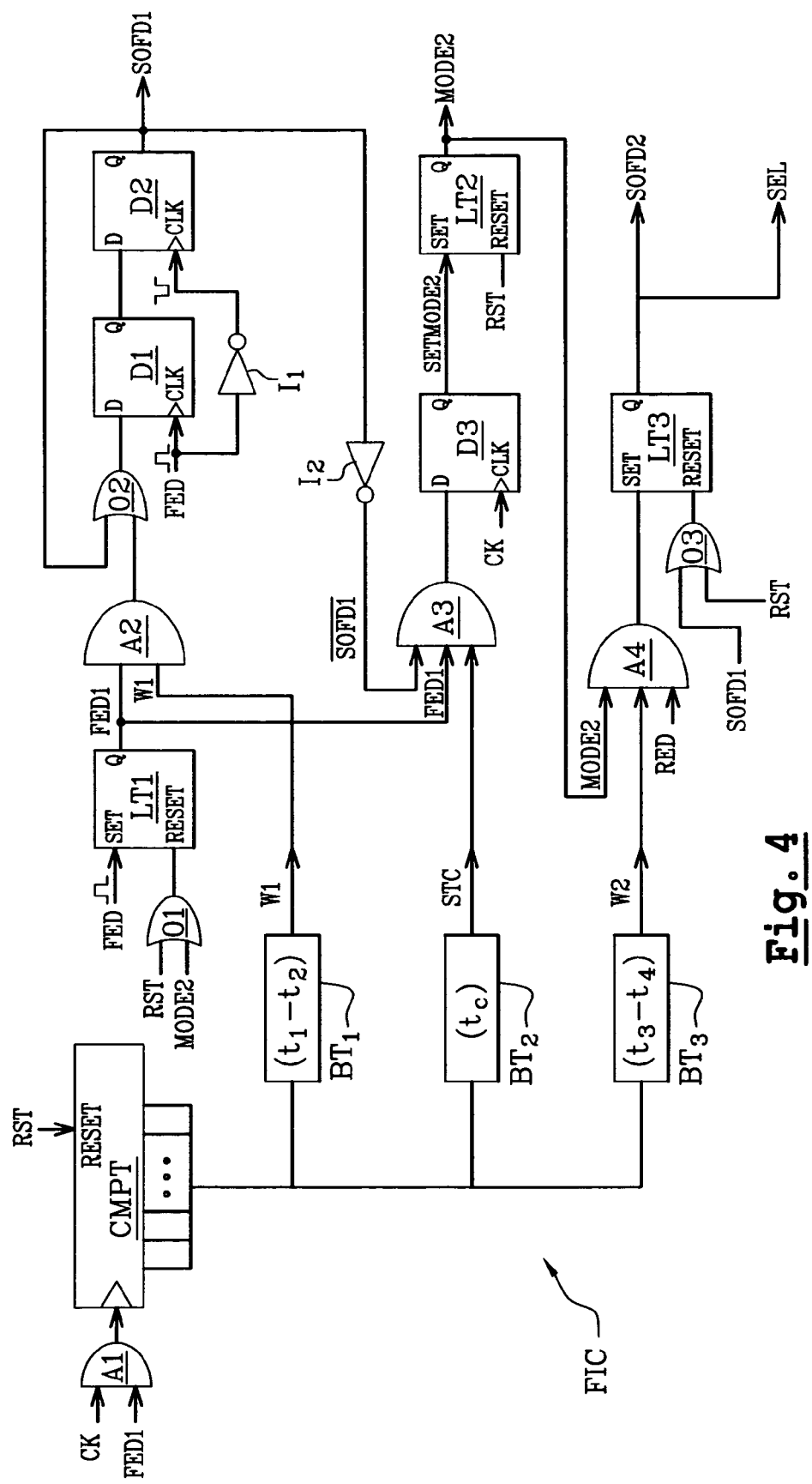
FIG. 4 is the logic diagram of a start of frame identification circuit according to the present invention, represented in block form in FIG. 3.

FIG. 4 is the logic diagram of an embodiment of the circuit FIC, produced exclusively in hard-wired logic in a simple manner and small in terms of silicon surface occupied, and designed to automatically identify the starts of frames SOF1 and SOF2 according to the method that has just been described. The circuit FIC comprises a counter CMPT and three decoding circuits BT1, BT2, BT3 detecting the times T1, T2, Tch, T3, T4 using a counting value delivered by the counter. The counter CMPT receives at its counting input, through an AND-type gate A1, the clock signal CK delivered by the circuit CEC1 (FIG. 3). The RESET input of the counter CMPT receives a general reset signal RST applied to various other elements of the circuit FIC. The circuits BT1, BT2, BT3 are connected to the output of the counter CMPT and respectively deliver signals W1, STC, W2. The signal W1 is set to 1 by the circuit BT1 when the output of the counter is between two values "VAL1" and "VAL2" respectively corresponding to the times T1 and T2. The signal STC is set to 1 by the circuit BT2 when the output of the counter is equal to a value "VALC" corresponding to the time Tch. The signal W2 is set to 1 by the circuit BT3 when the output of the counter is between two values "VAL3" and "VAL4" respectively corresponding to the times T3, T4.

The circuit FIC represented in FIG. 4 also comprises latches LT1, LT2, LT3 each having SET and RESET inputs and a Q output, three synchronous D latches D1, D2, D3 each having a D input, a trigger input CLK and a Q output, AND-type gates A2, A3, A4, OR-type gates O1, O2, O3, and inverting gates I1, I2.

The latch LT1 receives at its SET input the signal FED delivered by the demodulator DEMC (FIG. 3) and receives at its RESET input the output of the gate O1, which receives the signal RST and a signal MODE2 at input. The Q output of the latch LT1 delivers a signal FED1 that is applied to a second input of the gate A1 as well as to an input of the gate A2 and to an input of the gate A3. The gate A2 receives the signal W1 at a second input and its output is connected to an input of the gate O2 the output of which is applied to the D input of the latch D1. The latch D1 receives the signal FED at its input CLK and its Q output is applied to the D input of the latch D2. The latch D2 receives the inverted signal FED, delivered by the gate I1, at its input CLK and delivers the signal SOFD1 at the Q output, which is sent back to a second input of the gate O2.

The gate A3 receives the signal STC at a second input and the inverted signal SOFD1, delivered by the gate I2, at a third input. The output of the gate A3 is applied to the D input of the latch D3 the input CLK of which receives the clock signal CK and the Q output of which delivers a signal SETMODE2. The signal SETMODE2 is applied to the SET input of the latch LT2 the RESET input of which receives the signal RST and the Q output of which delivers the signal MODE2.

The signal MODE2 is applied to an input of the gate A4, which receives the signal W2 at a second input and the signal RED delivered by the demodulator DEMC (FIG. 3) at a third input. The output of the gate A4 is applied to the SET input of the latch LT3 the RESET input of which receives the output of the gate O3. The latter receives the signal RST and the signal SOFD1 at its inputs. The Q output of the latch LT3 delivers the signals SOFD2 and SEL, which are here identical.

The operation of the circuit FIC upon receiving a start of frame SOF1 is shown in FIGS. 5A to 5C, which respectively represent the profile of the start of frame SOF1 and the signals FED, FED1, W1, SOFD1, SOFD2/SEL. At an instant T0, and after resetting the entire circuit FIC by means of the signal RST, a first field hole appears (FIG. 5A). The signal FED has a pulse on 1 (FIG. 5B) which causes the signal FED1 to go to 1 (FIG. 5C) at the output of the latch LT1. When the time T1 is reached and the counter finds itself in a counting range corresponding to the interval T1-T2, the signal W1 goes to 1 (FIG. 5D), the output of the gate A2 goes to 1 and the D input of the latch D1 is set to 1. When the second field hole appears in the interval T1-T2, the signal FED again has a pulse on 1 (FIG. 5B). The Q output of the latch D1 goes to 1 on a rising edge of the pulse FED and the Q output of the latch D2 goes to 1 on a falling edge of the pulse FED (signal SOFD1, FIG. 5E). The change to 1 of the signal SOFD1 inhibits the gate A3, such that the rest of the circuit FIC remains blocked. Therefore, the signal SOFD2 can no longer go to 1 and remains equal to 0 (FIG. 5F).

The operation of the circuit FIC upon receiving a start of frame SOF2 is shown in FIGS. 6A to 6H, which respectively represent the profile of the start of frame SOF2 and the signals FED, FED1, STC, MODE2, W2, RED, SOFD2/SEL. At the instant T0, a first field hole appears (FIG. 6A) and the signal FED has a pulse on 1 (FIG. 6B) which causes the signal FED1 to go to 1 (FIG. 6C) at the output of the latch LT1. When the time Tch is reached, the signal STC goes to 1 at output of the circuit BT2 (FIG. 6D). The output of the gate A3 goes to 1, the output of the latch D3 goes to 1 (signal SETMODE2) and the signal MODE2 goes to 1 (FIG. 6E). The change to 1 of the signal MODE2 resets the latch LT1 such that the signal FED1 returns to 0 (FIG. 6C), which inhibits the part of the circuit FIC allocated to the detection of the start of frame SOF1, this part comprising the gates A1 and the latches D1, D2. Thus, the signal SOFD1 remains on 0 at output of the latch D2.

When the time T3 is reached and the counter is in a counting range corresponding to the interval T3-T4, the signal W2 goes to 1 (FIG. 6F). At the end of the field hole, a rising edge appears in the envelope of the magnetic field (FIG. 6A) between the instants T3, T4 and the signal RED has a pulse on 1 (FIG. 6G), the signal W2 at output of the circuit BT3 still being on 1. As the signal MODE2 is maintained on 1 (FIG. 6E) by the latch LT2, the output of the gate A4 goes to 1 and the signal SOFD2/SEL at output of the latch LT3 also goes to 1 (FIG. 6H).

In summary, after detecting the first falling edge FE1, the signal SOFD1 goes to 1 if and only if the second falling edge FE2 is detected between the instants T1 and T2, or the signal SOFD2 goes to 1 if and only if a rising edge RE1 is detected between the instants T3 and T4. Furthermore, the signal SOFD2 is locked on 0 when the signal SOFD1 goes to 1 and the signal SOFD1 is locked on 0 as from the instant Tch, when the signal MODE2 goes to 1. The change to 1 of the signal MODE2 indicates that the integrated circuit is capable of switching into an operating mode corresponding to a communication conforming to the ISO/IEC 14443-B protocol. The operating mode only being validated and confirmed as from the instant at which the signal SOFD2 goes to 1.

As the field holes according to the ISO/IEC 15693 standard correspond to a 10% or a 100% modulation of the amplitude of the magnetic field, they are accompanied by a total extinction of the clock signal CK in the case of a 100% modulation, due to the disappearance of the carrier. One advantageous embodiment of the present invention involves providing a reset of the counter CMPT and a forced shut-off of the clock CK after each falling edge, regardless of the depth of modulation of the amplitude of the magnetic field. This way, no distinction is drawn between a 10% modulation and a 100% modulation and the circuit FIC has a constant and homogeneous operation regardless of the depth of modulation. This feature is easily obtained in the embodiment in FIG. 4 by applying the signal FED to a third input of the gate A1. As the pulses of the signal FED are of a duration of 1 etu, they reset the counter CMPT and inhibit it for a duration of 1 etu. This duration of 1 etu is the duration of the pulses of the signal FED, and corresponds to the duration of the field holes so as not to draw a distinction between a 100% modulation and a 10% modulation. The values VAL1, VAL2 and VALC are therefore determined so as to account for the stopping of the counter for 1 etu after each falling edge, a value of 1 etu having to be deducted from the times T1, T2 and Tch so as to account for the stopping of the clock signal.

As the field holes according to the ISO/IEC 14443-B standard correspond to a 10% modulation of the amplitude of the magnetic field, they do not result in the extinction of the clock signal. However, it is advantageous to reset the counter and to inhibit it by means of the signal FED for a duration of 1 etu upon detecting the first falling edge, as it is not known whether this first falling edge corresponds to a start of frame SOF1 or SOF2. Furthermore, the counting of the times T3 and T4 then obeys the same rules as the counting of the times T1, T2 and Tch, a value of 1 etu having to be deducted from the times T3 and T4 so as to account for the stopping of the clock signal.

Referring again to FIG. 3, the detection by the decoding unit DEC20 of a change to 1 of the signal SOFD1 triggers in the same a classical process of decoding the data bits that follow the start of frame. Similarly, the detection by the decoding unit DEC21 of a change to 1 of the signal SOFD2 triggers in the same a classical process of decoding the data bits that follow the start of frame, starting with a start bit.

Furthermore, it was seen above that the signal SEL that drives the selection input of the multiplexer MUX is equal to the signal SOFD2. Thus, the multiplexer selects the output of the decoding unit DEC20 by default, independently of the value of the signal SOFD1, and only selects the output of the decoding unit DEC21 if the signal SOFD2 goes to 1.

In an alternative embodiment, the multiplexer could also be controlled by a signal SEL equal to the signal SOFD1.

Furthermore, the change to 1 of the signal SOFD1 can be used to switch off the decoding unit DEC2 and, reciprocally, the change to 1 of the signal SOFD2 can be used to switch off the decoding unit DEC1. In this case, providing the multiplexer might not be necessary, by materially connecting the outputs of the two decoding units DEC20, DEC21 and by ensuring that the output of each decoding unit is in a high impedance state when the decoding unit is deactivated.

Thus, the selection according to the present invention of a decoding unit can involve multiplexing the outputs of the decoding units by means of a multiplexer or switches arranged at these outputs, and/or deactivating the corresponding unit, such operations being able to be combined, and/or providing a material connection of the outputs of the decoding units together with putting one of the outputs to high impedance.

An alternative embodiment DECC3 of the decoding circuit according to the present invention is shown in FIG. 7. In this embodiment the circuit FIC is removed as an independent circuit shared by the decoding units, and the decoding circuit only comprises two decoding units DEC30, DEC31 and the multiplexer MUX. Each decoding unit detects the frame profile corresponding to the protocol allocated to it itself, the unit DEC30 detecting the profile SOF1 and the delivery of the signal SOFD1 for example, the unit DEC31 detecting the profile SOF2 and the delivery of the signal SOFD2. As above, the signal SOFD2 is used here to drive the multiplexer MUX but the signal SOFD1 could also be used for this purpose.

In the present embodiment, the circuit FIC described above is split into two parts respectively arranged in the unit DEC30 and in the unit DEC31. With reference to FIG. 4, the part arranged in the unit DEC30 comprises for example a first counter CMPT and the elements BT1, LT1, O1, O2, A1, D1 and D2, while the part arranged in the unit DEC31 comprises a second counter CMPT and the elements BT2, BT3, A3, A4, O3, D3, LT2 and LT3. In this case, the signal MODE2 delivered by the latch LT2 is sent to the unit DEC30.

Moreover, the signal SOFD1 can be applied to the unit DEC31 as a deactivating signal (when SOFD1=1) and the signal SOFD2 can be applied to the unit DEC30 as a deactivating signal (when SOFD2=1). The multiplexer MUX is optional if this deactivation is accompanied by putting the outputs of the decoding units to high impedance.

It will be understood that various other alternatives and embodiments of the present invention may be made. In particular, it was considered above that the integrated circuit IC2 comprised a single coding circuit CDC common to the two operating modes. That is the case in practice when the integrated circuit implements the ISO/IEC 15693 and ISO/IEC 14443-B protocols, which provide an identical coding when data are transmitted in the integrated circuit to reader direction. However, the present invention is capable of being applied to any other type of protocols and the coding circuit CDC can, if necessary, comprise two distinct coding units, selected by means of the signals SOFD1 and SOFD2.

Providing an integrated circuit capable of providing a communication according to three distinct protocols, or more, also comes within the scope of the present invention.

Finally, it was considered above, out of concern to remain simple, that the clock extractor circuit CEC1 delivers a clock signal CK that does not depend on the operating mode of the integrated circuit. It is advantageous in practice to provide a clock extractor circuit CEC1 with two operating modes, comprising an input for selecting the operating mode that is controlled by one of the signals SOFD1, SOFD2, SEL/SOFD1 (if SEL=SOFD1) or even SEL/SOFD2 as represented in FIGS. 3 and 7. In this case, the circuit CEC1 delivers a clock signal CK0 or a clock signal CK1 according to the operating mode of the integrated circuit.

As an example, the clock signal CK0 is adapted to the decoding unit DEC20, DEC30 and is delivered by default before one of the signals SOFD1, SOFD2 goes to 1. The clock signal CK1 is delivered when the signal SOFD2 goes to 1, and is adapted to the other decoding unit DEC21, DEC31.

Within the scope of the embodiment described above, the frequency of the clock signal CK0 is for example of 13.56/32 MHz i.e. 423 kHz when the integrated circuit operates in accordance with the ISO/IEC 15693 protocol, and is of 13.56/8 MHz i.e. 1.69 MHz when the integrated circuit operates in accordance with the ISO/IEC 14443-B protocol.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A contactless integrated circuit comprising:
   means for sending/receiving data by inductive coupling,
   means for providing a communication according to at least two determined protocols each comprising sending a start of frame at the beginning of a communication, and
   means for automatically switching into a communication mode conforming to one or other of the at least two determined protocols, depending on a profile of the start of frame received at the beginning of a communication, said start of frame being an incoming signal preceding and being independent of a value of the data and presenting a specific profile, said profile being characterized by a specific and invariable sequence of variation edges corresponding to the one or the other of the at least two determined protocols.

2. The contactless integrated circuit according to claim 1, further comprising:
- a first decoding unit for decoding data coded according to a first protocol,
- a second decoding unit for decoding data coded according to at least a second protocol, and
- means for selecting the first or the second decoding unit depending on the profile of the start of frame received at the beginning of a communication.

3. The contactless integrated circuit according to claim 1, further comprising:
- means for detecting a start of frame of a first type corresponding to a first protocol, arranged for delivering a first start of frame detection signal when a start of frame of the first type is detected, and
- means for detecting a start of frame of a second type corresponding to a second protocol, arranged for delivering a second start of frame detection signal when a start of frame of the second type is detected.

4. The contactless integrated circuit according to claim 1, further comprising:
- means for detecting a start of frame of a first type corresponding to a first protocol, configured to detect a first variation edge of the signal received by inductive coupling, then to detect, in a first time window, a second variation edge of the signal received by inductive coupling, and
- means for detecting a start of frame of a second type corresponding to a second protocol, configured to detect a first variation edge of a signal received by inductive coupling, then to detect, in a second time window, a second variation edge of a signal received by inductive coupling.

5. The contactless integrated circuit according to claim 4, wherein:
- the means for detecting a start of frame of the first type are configured to detect two variation edges of a same type, and
- the means for detecting a start of frame of the second type are configured to detect a variation edge of a first type and a variation edge of a second type that is the opposite of the first type.

6. The contactless integrated circuit according to claim 4, further comprising:
- means for inhibiting the means for detecting a start of frame of the first type, when a determined time situated between the first and the second time windows has elapsed after appearance of a first variation edge of the signal received by inductive coupling.

7. The contactless integrated circuit according to claim 3, further comprising:
- means for inhibiting the means for detecting a start of frame of the second type when a start of frame of the first type is detected.

8. The contactless integrated circuit according to claim 3, further comprising:
- a start of frame identification circuit common to the first and second decoding units, wherein the means for detecting a start of frame of the first type and the means for detecting a start of frame of the second type are arranged.

9. The contactless integrated circuit according to claim 3, comprising:
- a first decoding unit for decoding data coded according to the first protocol, the first decoding unit including said means for detecting a start of frame of the first type,
- a second decoding unit for decoding data coded according to at least a second protocol, the second decoding unit including said means for detecting a start of frame of the second type.

10. The contactless integrated circuit according to claim 2, wherein the selection means comprise means for deactivating the second decoding unit or for deactivating the first decoding unit.

11. The contactless integrated circuit according to claim 2, wherein the selection means comprise means for multiplexing the outputs of the decoding units.

12. The contactless integrated circuit according to claim 11, wherein the multiplexing means is arranged for selecting by default the output of the first decoding unit and for selecting the output of the second decoding unit when a start of frame corresponding to the protocol of the second decoding unit is received.

13. The contactless integrated circuit according to claim 11, wherein the multiplexing means comprises a selection input driven by a start of frame detection signal.

14. The contactless integrated circuit according to claim 1, further comprising:
- a clock extractor circuit arranged for delivering a first clock signal of determined frequency when the integrated circuit is in a communication mode conforming to a first protocol, and delivering a second clock signal of a different frequency from that of the first clock signal, when the integrated circuit is in a communication mode conforming to a second protocol.

15. The contactless integrated circuit according to claim 1, further comprising:
- means for communicating according to at least the ISO/IEC 15693 protocol and the ISO/IEC 14443-B protocol, and
- means for automatically switching into a communication mode conforming to one or other of the at least the ISO/IEC 15693 and ISO/JEC 14443-B protocols depending on the profile of a start of frame received at the beginning of a communication.

16. A device comprising:
- a contactless communication interface configured to receive a data carrier signal comprising a start of frame followed by coded data, and
- at least two decoding units, each decoding unit being arranged to decode data according to a protocol, one of the at least two decoding units being automatically selected by the device depending on a profile of the start of frame received, said start of frame being an incoming signal preceding and being independent of a value of the coded data and presenting a specific profile, said profile being characterized by a specific and invariable sequence of variation edges corresponding to the protocol.

17. The device of claim 16, comprising a start of frame detection circuit to detect at least a start of frame of a first type and a start of frame of a second type.

18. The device of claim 17, wherein the start of frame detection circuit automatically selects one of the at least two decoding units depending on the profile of the start of frame received at a beginning of a communication.

19. The device of claim 17, wherein the start of frame detection circuit is configured to detect a first variation edge of the data carrier signal, then to detect a second variation edge of the data carrier signal, in one of a first time window and a second time window.

20. The device of claim 17, wherein the start of frame detection circuit is configured to detect two variation edges of a same type of the data carrier signal and a variation edge of a first type and a variation edge of a second type that is the opposite of the first type.

21. The device of claim 17, wherein the start of frame detection circuit inhibits the detection of one of the start of frame of the first type and of the second type when a determined time situated between a first time window and a second time window has elapsed after appearance of a first variation edge of the data carrier signal.

22. The device of claim 17, wherein the start of frame detection circuit inhibits the detection of the start of frame of the second type when a start of frame of the first type is detected.

23. The device of claim 17, wherein the start of frame detection circuit is a logic circuit.

24. The device of claim 17, further comprising a multiplexer controlled by the start of frame detection circuit and arranged to select one output of one of the at least two decoding units.

25. The device of claim 17, wherein the start of frame detection circuit deactivates the second decoding unit if the start of frame of the first type is detected and deactivates the first decoding unit if the start of frame of the second type is detected.

26. The device of claim 17 wherein the start of frame detection circuit is divided into at least two parts respectively arranged in said at least two decoding units, each part being arranged to identify one start of frame and to deactivate at least one decoding unit when the start of frame is detected.

27. The device of claim 16, further comprising a clock extractor circuit which supplies a first clock signal of determined frequency when the device is in a communication mode conforming to a first protocol, and a second clock signal of a different frequency from that of the first clock signal, when the device is in a communication mode conforming to a second protocol.

28. The device of claim 16, configured to receive data according to at least a ISO/IEC 15693 protocol and a ISO/IEC 14443-B protocol.

29. A device comprising:
a contactless communication interface configured to receive a data carrier signal comprising a start of frame followed by coded data,
a first decoding unit for decoding data coded according to a first protocol, the first decoding unit including a first start of frame detection circuit arranged to detect a start of frame of a first type, and
a second decoding unit for decoding data coded according to at least a second protocol, the second decoding unit including a second start of frame detection circuit arranged to detect a start of frame of a second type, said start of frame being an incoming signal preceding and being independent of a value of the coded data and presenting a specific profile. said profile being characterized by a specific and invariable sequence of variation edges corresponding respectively to each of the first and the second protocols.

30. The device of claim 29, wherein the first start of frame detection circuit is arranged to deactivate the second decoding unit when it detects the start of frame of the first type.

31. The device of claim 29, wherein the second start of frame detection circuit is arranged to deactivate the first decoding unit when it detects the start of frame of the second type.

32. The device of claim 29 wherein each start of frame detection circuit is a logic circuit.

33. A method for receiving data according to at least two protocols, the method comprising:
receiving a data carrier signal comprising a start of frame followed by coded data, and
automatically switching into at least one of a first data decoding mode and a second data decoding mode depending on a profile of the start of frame, said start of frame being an incoming signal preceding and being independent of a value of the coded data and presenting a specific profile, said profile being characterized by a specific and invariable sequence of variation edges corresponding to each of the at least two protocols.

34. The method of claim 33, further comprising:
detecting a start of frame of a first type comprising detecting a first variation edge of the data carrier signal and detecting, in a first time window, a second variation edge of the data carrier signal, and
a step of detecting a start of frame of a second type comprising detecting a first variation edge of the data carrier signal then detecting, in a second time window, a second variation edge of the data carrier signal.

35. The method of claim 33, further comprising:
detecting a start of frame of a first type comprising detecting two variation edges of a same type, and
detecting a start of frame of a second type comprising detecting a variation edge of a first type and a variation edge of a second type that is the opposite of the first type.

36. The method of claim 33, further comprising selecting by default an output of a first decoding unit and selecting an output of a second decoding unit when a determined start of frame is received.

37. A method for receiving data according to at least two protocols, the method comprising:
receiving a data carrier signal comprising a start of frame followed by coded data,
providing a first decoding unit for decoding data coded according to a first protocol,
providing a second decoding unit for decoding data coded according to at least a second protocol, and
using the first decoding unit or the second decoding unit depending on a profile of the start of frame, said start of frame being an incoming signal preceding and being independent of a value of the coded data and presenting a specific profile, said profile being characterized by a specific and invariable sequence of variation edges corresponding to each of the first and second protocols.

38. The method of claim 37, further comprising:
detecting a start of frame of a first type comprising detecting a first variation edge of the data carrier signal and detecting, in a first time window, a second variation edge of the data carrier signal, and
a step of detecting a start of frame of a second type comprising detecting a first variation edge of the data carrier signal then detecting, in a second time window, a second variation edge of the data carrier signal.

39. The method of claim 37, further comprising:
detecting a start of frame of a first type comprising detecting two variation edges of a same type, and
detecting a start of frame of a second type comprising detecting a variation edge of a first type and a variation edge of a second type that is the opposite of the first type.

40. The method of claim 37, further comprising selecting by default an output of the first decoding unit and selecting an output of the second decoding unit when a determined start of frame is received.

41. A method for receiving data according to at least two protocols, the method comprising:

receiving a data carrier signal comprising a start of frame followed by coded data, providing a first decoding unit for decoding data coded according to a first protocol, providing a second decoding unit for decoding data coded according to at least a second protocol, and activating the first or the second decoding unit depending on a profile of the start of frame, said start of frame being an incoming signal preceding and being independent of a value of the coded data and presenting a specific profile, said profile being characterized by a specific and invariable sequence of variation edges corresponding to each of the first and the at least second protocol.

42. The method of claim 41, further comprising:

detecting a start of frame of a first type comprising detecting a first variation edge of the data carrier signal and detecting, in a first time window, a second variation edge of the data carrier signal, and a step of detecting a start of frame of a second type comprising detecting a first variation edge of the data carrier signal then detecting, in a second time window, a second variation edge of the data carrier signal.

43. The method of claim 41, further comprising:

detecting a start of frame of a first type comprising detecting two variation edges of a same type, and detecting a start of frame of a second type comprising detecting a variation edge of a first type and a variation edge of a second type that is the opposite of the first type.

44. The method of claim 41, further comprising selecting by default an output of the first decoding unit and selecting an output of the second decoding unit when a determined start of frame is received.

45. A method for receiving data according to at least two protocols, the method comprising:

receiving a data carrier signal comprising a start of frame followed by coded data, providing a first decoding unit for decoding data coded according to a first protocol, providing a second decoding unit for decoding data coded according to at least a second protocol, and deactivating the first or the second decoding unit depending on a profile of the start of frame, said start of frame being an incoming signal preceding and being independent of a value of the coded data and presenting a specific profile, said profile being characterized by a specific and invariable sequence of variation edges corresponding each of the first and the at least second protocol.

46. The method of claim 45, further comprising:

detecting a start of frame of a first type comprising detecting a first variation edge of the data carrier signal and detecting, in a first time window, a second variation edge of the data carrier signal, and a step of detecting a start of frame of a second type comprising detecting a first variation edge of the data carrier signal then detecting, in a second time window, a second variation edge of the data carrier signal.

47. The method of claim 45, further comprising:

detecting a start of frame of a first type comprising detecting two variation edges of a same type, and detecting a start of frame of a second type comprising detecting a variation edge of a first type and a variation edge of a second type that is the opposite of the first type.

48. The method of claim 45, further comprising selecting by default an output of the first decoding unit and selecting an output of the second decoding unit when a determined start of frame is received.

49. A system comprising:

a first device configured to send a data carrier signal comprising a start of frame followed by coded data, a second device comprising:

a contactless communication interface configured to receive the data carrier signal, and at least two decoding units, each decoding unit being arranged to decode data according to a protocol, one of said at least two decoding units being automatically selected by the second device depending on a profile of the start of frame received, said start of frame being an incoming signal preceding and being independent of a value of the data and presenting a specific profile, said profile being characterized by a specific and invariable sequence of variation edges corresponding to the protocol.

50. The system of claim 49, wherein the second device comprises a start of frame detection circuit to detect at least a start of frame of a first type and a start of frame of a second type.

51. The system of claim 50, wherein the start of frame detection circuit automatically selects one of said at least two decoding units depending on the profile of the start of frame received at a beginning of a communication.

52. The system of claim 50, wherein the start of frame detection circuit is configured to detect a first variation edge of the data carrier signal, then to detect a second variation edge of the data carrier signal in one of a first time window and a second time window.

53. The system of claim 50, wherein the start of frame detection circuit is configured to detect two variation edges of a same type of the data carrier signal and a variation edge of a first type and a variation edge of a second type that is the opposite of the first type.

54. The system of claim 50, wherein the start of frame detection circuit inhibits the detection of one of the start of frame of the first type and of the second type when a determined time situated between a first time window and a second time window has elapsed after appearance of a first variation edge of the data carrier signal.

55. The system of claim 50, wherein the start of frame detection circuit inhibits the detection of the start of frame of the second type when a start of frame of the first type is detected.

56. The system of claim 50, wherein the start of frame detection circuit is a logic circuit.

57. The system of claim 50, wherein the second device comprises a multiplexer controlled by the start of frame detection circuit and arranged to select one output of one of the at least two decoding units.

58. The system of claim 50, wherein start of frame detection circuit deactivates the second decoding unit if the start of frame of the first type is detected and deactivates the first decoding unit if the start of frame of the second type is detected.

59. The system of claim 50 wherein the start of frame detection circuit is divided into at least two parts respectively arranged in said at least two decoding units, each part being arranged to identify one start of frame and to deactivate at least one decoding unit when the start of frame is detected.

60. The system of claim 49, wherein the second device further comprises a clock extractor circuit which supplies a first clock signal of determined frequency when the second device is in a communication mode conforming to a first protocol, and a second clock signal of a different frequency from that of the first clock signal, when the second device is in a communication mode conforming to a second protocol.

61. The system of claim 49, wherein the second device is configured to receive data according to at least the ISO/IEC 15693 protocol and the ISO/JEC 14443-B protocol.

62. A system comprising:
- a first device configured to send a data carrier signal comprising a start of frame followed by coded data,
- a second device comprising:
  - a contactless communication interface configured to receive a data carrier signal comprising a start of frame followed by coded data,
  - a first decoding unit for decoding data coded according to a first protocol, the first decoding unit including a first start of frame detection circuit arranged to detect a start of frame of a first type, and
  - a second decoding unit for decoding data coded according to at least a second protocol, the second decoding unit including a second start of frame detection circuit arranged to detect a start of frame of a second type, said start of frame being an incoming signal preceding and being independent of a value of the data and presenting a specific profile, said profile being characterized by a specific and invariable sequence of variation edges corresponding to each of the first and the at least second protocol.

63. The system of claim 53, wherein the first start of frame detection circuit is arranged to deactivate the second decoding unit when it detects the start of frame of the first type.

64. The system of claim 53, wherein the second start of frame detection circuit is arranged to deactivate the first decoding unit when it detects the start of frame of the second type.

65. The system of claim 53, wherein each start of frame detection circuit is a logic circuit.

* * * * *